United States Patent [19]
Armstrong

[11] 3,916,949
[45] Nov. 4, 1975

[54] ENCLOSED GATE VALVE
[76] Inventor: George W. Armstrong, P.O. Box 507, Fairborn, Ohio 45324
[22] Filed: Oct. 1, 1973
[21] Appl. No.: 402,408

[52] U.S. Cl. ............... 137/609; 222/504; 222/556; 251/298
[51] Int. Cl.² ............................................ F16K 1/20
[58] Field of Search .......................... 137/609, 612; 251/298–303, 291, 292; 222/504, 556

[56] References Cited
UNITED STATES PATENTS

| | | | |
|---|---|---|---|
| 786,603 | 4/1905 | Schenck | 251/302 X |
| 1,105,209 | 7/1914 | Sauchereau | 251/301 |
| 1,458,144 | 6/1923 | Olinger | 251/292 X |
| 1,619,956 | 3/1927 | Renehan | 251/301 X |
| 2,620,673 | 12/1952 | Whitcomb | 251/299 X |
| 2,668,684 | 2/1954 | Metzger | 251/329 X |
| 2,806,489 | 9/1957 | Armstrong | 251/301 X |
| 3,198,482 | 8/1965 | Bertels | 251/302 |
| 3,257,045 | 6/1966 | Carpentier | 222/504 X |
| 3,380,475 | 4/1968 | Armstrong | 137/609 |
| 3,429,782 | 2/1969 | Hicks et al. | 222/504 X |
| 3,545,653 | 12/1970 | Blackmore | 222/556 |
| 3,578,283 | 5/1971 | Jones | 251/298 |

Primary Examiner—Charles J. Myhre
Assistant Examiner—Ira S. Lazarus
Attorney, Agent, or Firm—Biebel, French & Bugg

[57] ABSTRACT

A gate type blade valve is disclosed which has a fully enclosed blade and is adapted particularly for controlling the flow of dry materials. A curved valve blade is movable in the valve body adjacent the inlet between open and closed positions. The valve housing incorporates an offset portion at one lateral side of the inlet to receive the blade in its open position. The offset fully encloses the blade and prevents loss of material outwardly and prevents contamination inwardly. It also eliminates the necessity for sealing across a blade slot. A wiper seal engages the top of the blade so that the inlet is sealed from the enclosing offset housing portion when the blade is closed.

The blade is mounted on a pair of sector-shaped arms which have small frontal areas and offer little resistance to movement through material flowing through the housing. Crank arms are provided by which movement of the blade is controlled and the blade may be moved by power or by a hand lever, or by a remote pull rope connected to the lever. In one embodiment, the housing has a removable cover for access after the valve is installed in the event replacement of the blade is required, or to clean out the valve or obtain a sample of the material. A two-way diverter valve with fully enclosed blades is disclosed in another embodiment.

1 Claim, 13 Drawing Figures 3,916,949

ENCLOSED GATE VALVE

BACKGROUND OF THE INVENTION

The present invention relates to curved-blade, flow control valves which are particularly adapted for controlling the flow of dry particulate material of the general type shown in my U.S. Pat. No. 3,380,475 issued Apr. 30, 1968. In that patent a curved flow control blade moves through a blade slot formed in one wall of a rectangular housing and may be supported on pairs of inside and outside arms. Movement of the blade is by the direct application of opening or closing forces to the outside blade arms.

The valve as shown in that patent has been proved to be highly successful for controlling the flow of a wide variety of materials including metal shavings and small solid particles, food products, coal and fine material such as cement and fly ash. However, there is often a requirement to provide a valve of the general type, utilizing the advantages of a curved flow control blade pivotally mounted substantially on a center of curvature, in which the blade is fully enclosed to eliminate completely any dusting or loss of material around the blade slot and to prevent contamination of the material. The need for a fully enclosed valve may be greatest where light or powdery material is being discharged at high velocities. The sudden closing of the blade may momentarily cause a back pressure or an upward surge of material against the blade bottom. This is a rather severe condition which is difficult to be retained by conventional blade seals at the slot. In these and other conditions, a fully enclosed blade is desirable.

SUMMARY OF THE INVENTION

The present invention is directed to embodiments of a fully enclosed blade valve of the general type disclosed in my U.S. Pat. No. 3,380,475. The housing is provided with an offset portion at one side of the inlet proportioned to receive and fully enclose an internally supported blade in its open position. A seal is positioned adjacent the inlet in wiping engagement with the exposed convex surface of the blade to isolate the offset blade-receiving portion from the inlet.

The blade is supported for movement substantially about its center of curvature and is preferably mounted on a pair of sector-shaped arms. The edges of these arms present a narrow exposed area to the material within the valve body. Movement of the blade is effected by external crank arms connected to the blade support arms through the pivot axis and the blade may be manually or power operated.

In one embodiment, the offset portion is fully closed and the blade may be inserted and removed through the valve housing opening at the inlet. In another embodiment a removable cover is formed on the offset portion, to provide access to the blade, or to clean out the valve or to make accessible material in the valve. A modified blade support includes a fastener-less arrangement adjacent the forward edge of the blade by means of which the blade is removably supported on the arms.

An important object of this invention is the provision of a flow control valve employing a curved flow control blade in which the blade is fully enclosed by an integral portion of the valve housing.

Further objects include the provision of fully enclosed blade type valves which may be hand or power operated, and which may take the form of a single blade or a double blade diverter-valve, and in which the valve housings have offset portions which fully enclose the blades in their open positions, which housings are self-cleaning. The housings may have access openings to permit blade changing and housing cleanout, or to provide for material sampling.

These and other objects and advantages of the invention will be apparent from the following description, the accompanying drawings, and the appended claims.

DESCRIPTION OF PREFERRED EMBODIMENTS

Referring to the embodiment of FIGS. 1–5, an enclosed blade-type valve for controlling the flow of dry particulate material is illustrated generally at 10 as including a generally rectangular body or valve housing 12 extending between an inlet 14 and an outlet 15. Both the inlet and the outlet are provided with peripheral angletype mounting flanges 16 providing a convenient means by which the valve may be attached to a conduit.

Figure 2:
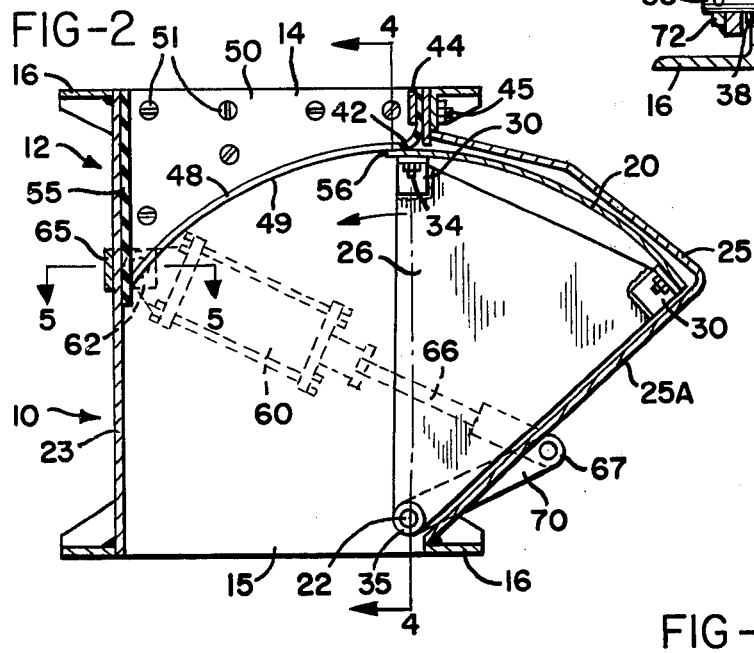
FIG. 2 is a vertical section through the valve of FIG. 1 with the blade in the open position.
Figure 3:
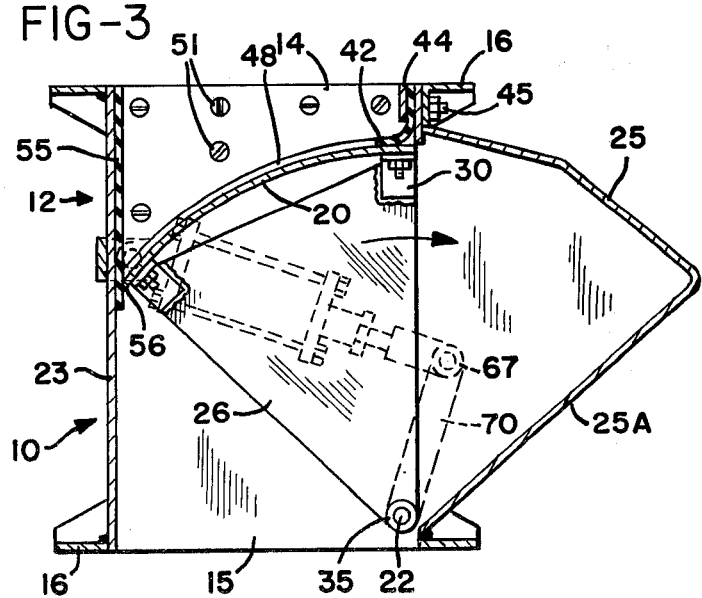
FIG. 3 is a view similar to FIG. 2 showing the blade in the closed position.

The valve 10 includes a curved flow-control blade which is mounted with its concave side facing the outlet 15 and with its center of curvature 22 positioned within the limits of the valve housing 12 adjacent to the outlet 15 in the manner taught in my U.S. Pat. No. 2,806,489 of 1957. The blade 20 is thus movable about a pivot point 22 between an open position as shown in FIG. 2 in which the blade is retracted to one side of the housing 12 and a closed position as shown in FIG. 3 in which the blade extends fully across the inlet 14. In the closed position the blade 20 comes into rest against the front wall 23 of the housing 12.

Figure 4:
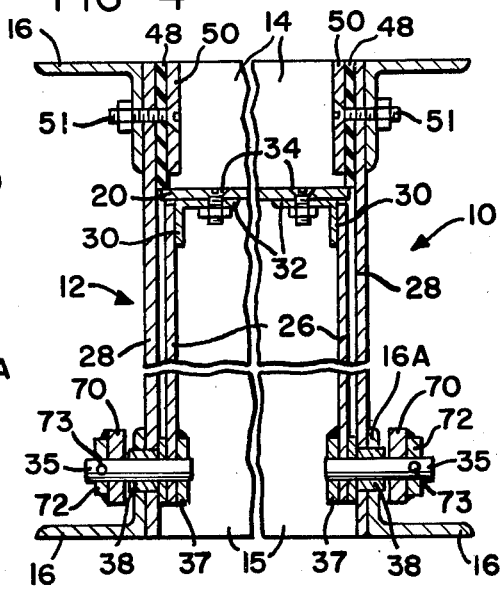
FIG. 4 is a fragmentary vertical view taken along the line 4—4 of FIG. 2.

The back wall of the housing 12 is formed with and outwardly and downwardly inclined configuration forming an offset portion 25. The side walls are correspondingly extended to meet the offset back wall to provide an internal space which is proportional to receive the blade 20 in its fully open position, as shown in FIG. 2. The blade itself is mounted for arcuate movement on inside arm means. These may comprise a pair of sector-shaped arms 26, each positioned closely adjacent to one of the housing side walls 28, as shown in FIG. 4. Angle supports 30 are welded at the upper arcuate corners of the arms 26, and are formed with inwardly turned flanges or ends 32 in underlying relation to the blade 20. In this manner the leading and trailing edges of the blade 20 are secured directly to the flanges 32 of the supports 30 by removable fasteners 34. It will be noted that the tops of these fasteners are formed flush with the upper or convex surface of the blade 20.

The slope of the downwardly inclined leg 25A of the offset portion is such as to be self-cleaning by gravity of any material which may fall on its inside inclined surface. The downwardly inclined leg 25A is also proportioned to provide sufficient clearance for the blade-supporting arms 26 in the open position of the blade, as shown in FIG. 2. The offset portion 25 may be extended and the body lengthened to provide a greater slope angle if required, or the valve housing may be operated in an inclined condition if required, to prevent hangup of the material in the offset portion.

The lower ends of the sector-shaped arms 26 are supported on a pair of outwardly extending rods or stub shafts 35. The shafts 35 are secured to the arms 26 for movement therewith in any suitable manner, as by collars 37 welded to the inside surfaces of the arms. The shafts 35 extend through the side walls 28 on suitable bushings or sleeve bearings 38. While simple sleeve bearings 38 are shown, it is within the scope of the invention to employ flange-type sealed bearings. For providing additional strength, the bearings 38 are located so that they extend through the upper legs 16A of the lower mounting flanges 16, thus utilizing the additional thickness of the flange as well as the thickness of the housing wall for the support of the bearings 38.

The support arms 26 provide a narrow frontal area and offer little resistance to the movement of the blade 20 through material in the valve housing. Unless the valve housing is completely filled with material, there will be little resistance to the closing movement of the blade 20, since as the blade closes across the inlet 14 it cuts off the flow through the valve, so that there will be little, if any, material under the blade to obstruct its movment. Also, due to the geometry of the blade, and the offset pivot point 22, the blade tends to be self-closing. The closing force is aided by reason of the weight of the material onto the top of the blade and the fact that the material falls away from under the blade leaving a void for the blade to move into. After the blade is closed, the weight of the material tends to hold the blade closed.

The offset wall 25 and the extended portions of the side walls 28 in effect form a housing portion which fully encloses the blade 20 while providing a clearance space for its movement into the open position. It is important to provide a seal at the inlet 14 between the blade and the offset wall portion 25 to prevent the flow of material around the blade in the closed position. For this purpose, an inwardly directed elastomeric wiping seal 42 may be mounted by a keeper plate 44 and retainer bolts 45 at the inlet 14 with its lower end in wiping engagement with the convex surface of the blade 20, as most clearly shown in FIG. 8. This wiper seal may be constructed similarly to the seal 60 of my U.S. Pat. No. 3,380,475. Also, side cam plates or side seals 48 having lower curved edges 49 may be employed on the inside surfaces of the side walls 28 and retained by plates 50 and fasteners 51 as shown in FIGS. 2 and 4. The side seals 48 may be made of an elastomeric material or may be made of soft metal, and engage the curved upper edge of the blade 20 in the closed position. In addition, an optional elastomeric front seal 55 may be mounted on the inside surface of the front wall 23 to be engaged by the leading edge 56 of the blade 20.

The movement of the blade 20 may be provided with a cam action by reason of having its pivot point somewhat offset from its center of curvature so that the blade moves slightly upwardly into camming engagement with the side seals 48 during closing movement of the blade, in the manner disclosed in my U.S. Pat. No. 3,380,475.

Figure 5:
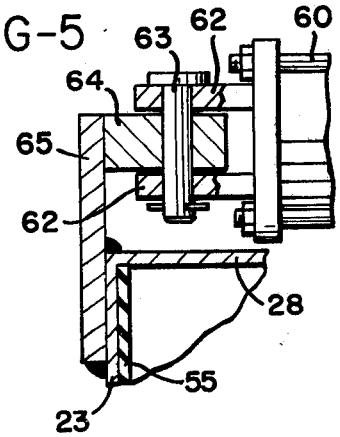
FIG. 5 is an enlarged fragmentary section taken along the line 5—5 of FIG. 2.

Means for controlling the movement of the blade 20 between its open and closed positions may include a pair of piston motors 60 which have the cylinder end attached to the housing and the piston rod connected through a conventional clevice to control the movement of the blade. As shown in FIG. 5 a rear clevice portion 62, formed on each cylinder, is secured by a pin 63 to a fixed abutment 64 carried on an offset plate 65 on the front wall 23. The rod 66 is connected by a clevice 67 to a crank arm 70. The lower end of the arm 70 is provided with a welded collar 72 and is removable attached by any suitable means to the shaft 35 such as by the set screw 73, or by keys or the like.

Figure 11:
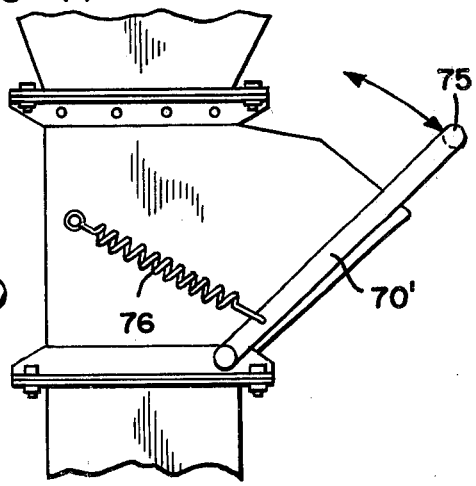
FIG. 11 is an elevational view of a manually-operated version of the valve.

The valve of the present invention is also useful where manual operation or control is desired. Since there is little resistance to the movement of the blade, a hand grip or handle may be used for opening the blade and a simple return spring may be used for closing the blade. An arrangement is shown in FIG. 11 in which the arms 70' are extended beyond the offset portion 25 and are connected together by a handle 75. The handle may be operated directly or by a rope pull if desired. The latter arrangement has particular utility for use in low cost reliable installations where the flows from one or more overhead bins or conduits are to be controlled by rope pulls on the ground. The inherent self-closing characteristic of the valve, together with the return springs 76, assures the complete closing of the blade merely upon the release of a pulling force on the handle 75.

In the embodiments of FIGS. 1–5, the blade 20 is accessible for removal and replacement through the inlet 14, in the event it becomes necessary to replace the blade 20. However, it may be desirable to provide a more convenient arrangement by which the blade may be replaced if it is suspected of wear or damage without tear-down of the valve and without removing the valve housing from the conduit. The embodiments of 6-10 are particularly adapted to an arrangement for convenient access to a blade for replacement or the like.

Figure 6:
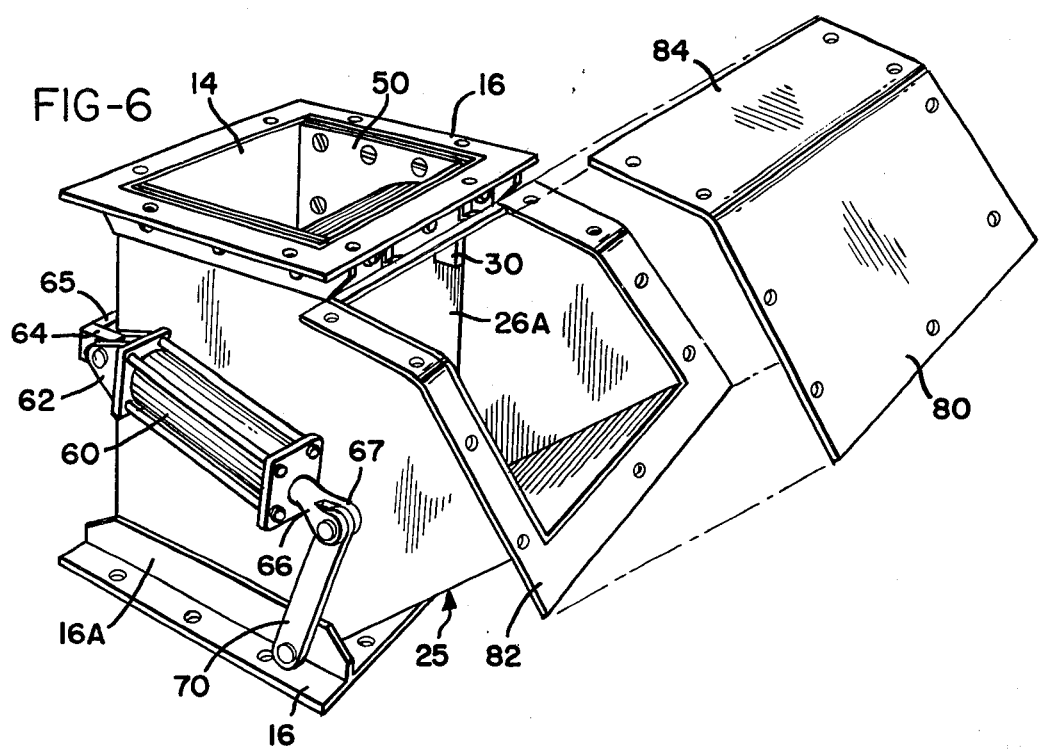
FIG. 6 is a perspective view of a modified valve.
Figure 7:
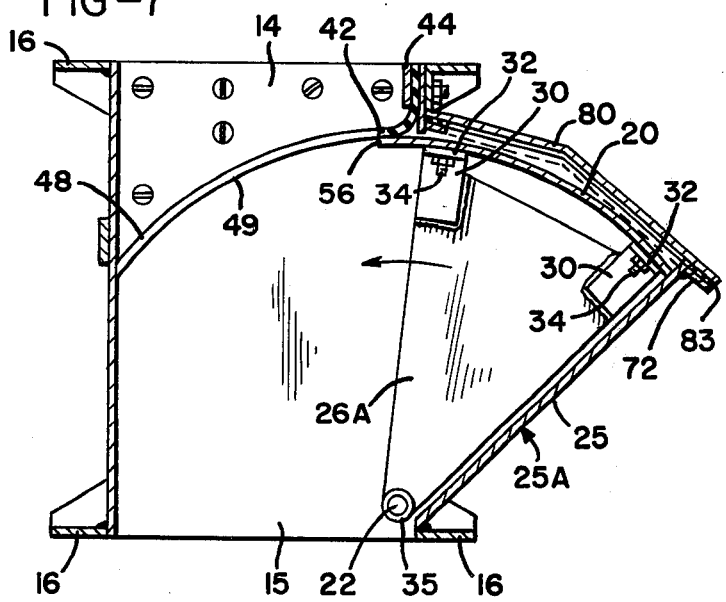
FIG. 7 is a vertical section through the valve of FIG. 6.
Figure 8:
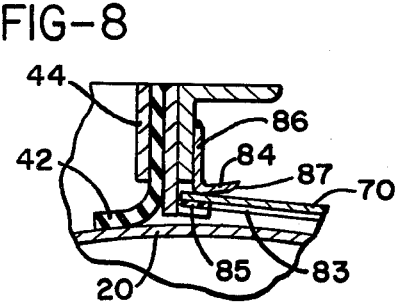
FIG. 8 is an enlarged fragmentary section of the wiper seal and cover hold-down.

In the embodiment shown as FIGS. 6–8 the offset housing portion 25 is formed with an upper removable cover plate 80 which is mounted on the housing by suitable fasteners extending through a peripheral mounting flange 82 formed on the side and end walls. A gasket 83 (FIG. 7) is positioned between the cover plate 80 and its mounting flange 82. It is not feasible to employ fasteners along the edge 84 of the cover plate 80 adjacent the inlet and accordingly, a hold down arrangement may be employed as shown in FIG. 8 including a lower transverse support strap 85 forming a ledge on which the edge 84 of the cover plate 80 may rest. A pair of angle-shaped keepers 86 have lower edge 87 which form with the strap 85 wedge-shaped spaces for tightly receiving the edge 84 between its legs 87 and the strap

85.

The embodiments of FIGS. 6–8 also illustrate a modified form of the support arms in which the arms 26A are somewhat foreshortened in the arcuate direction, so that when the blade 20 is in its fully retracted position as shown in FIG. 7 each of the fasteners 34 on the flanges 32 are accessible through the opening. The blade 20 may be removed for inspection and/or replacement by simple removal of the cover plate 80.

Figure 9:
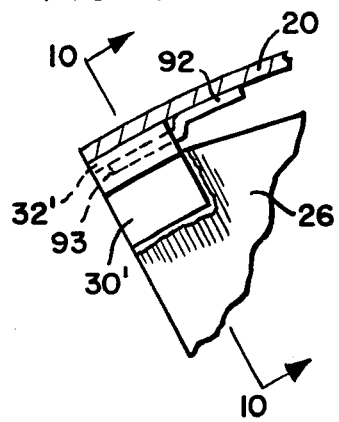
FIG. 9 is an enlarged detail of a modified blade support, taken along the line 9—9 of FIG. 10.
Figure 10:
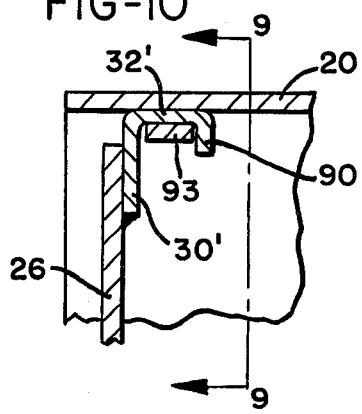
FIG. 10 is a transverse fragmentary section of the modified blade support taken along the line 10—10 of FIG. 9.

A further modified arrangement for supporting the valve blade is illustrated in FIGS. 9 and 10. In this case the full width support arms 26 of FIGS. 2 and 3 may be used. The forward pair of angle-shaped supports 30' are modified by the forming of a downwardly-turned edge 90 on the flange 32 or by attaching a small tab (not shown) to the flange to form a U-shaped support as shown in FIG. 10. The blade 20 is provided with a pair of forwardly extending offset tongues 92 on its undersurface which have free ends 93 positioned and proportioned to be received under the flanges 32' between the edges 90 and the main portions of the supports 30. In this manner the forward edge 56 of the blade 20 is secured by a sliding action onto the blade supports 30' at the leading edges of the support arms 26, and thus a fastener-less arrangement is provided for the support of the forward edge of the blade 20. It is then only necessary to remove the fasteners 34 at the rear portion of the blade to permit its insertion and removal from the blade support arms 26 through the access opening as in the embodiment of FIGS. 6 and 7.

Figure 12:
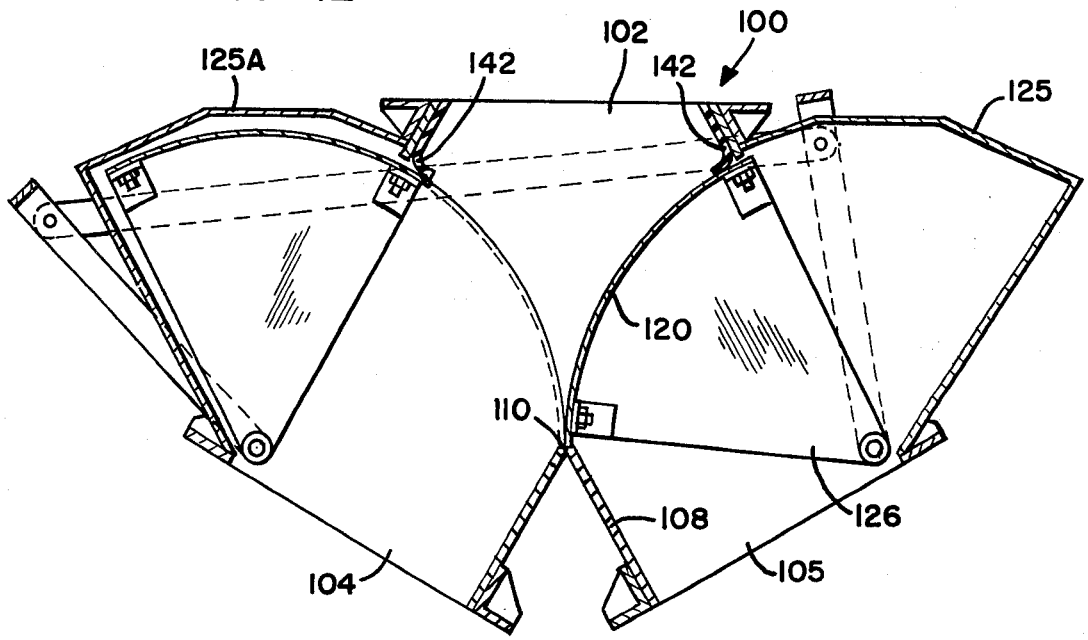
FIG. 12 is a sectional view of a two-way diverter valve embodiment.
Figure 13:
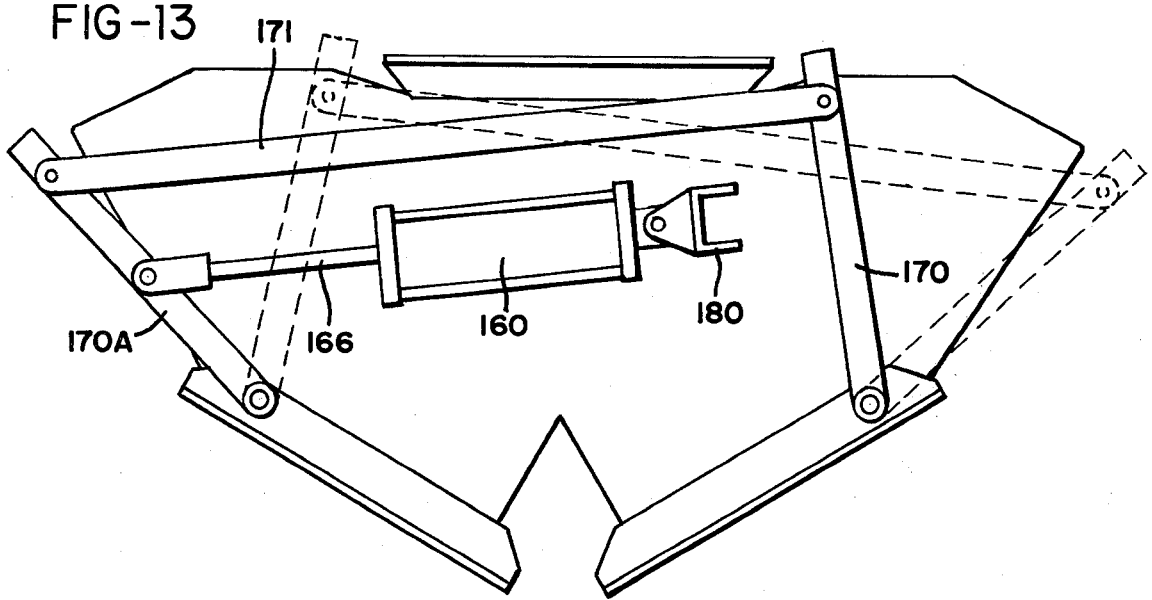
FIG. 13 is a side elevation of the valve of FIG. 12.

The invention is shown in FIGS. 12 and 13 as being applied to an equal leg two-way diverter valve 100. Two general principles of construction and operation of the diverter valve 100 are essentially the same as disclosed and described in my U.S. Pat. No. 3,380,475 for the valve reference No. 110 therein. In the present embodiment, the blades are fully enclosed by the valve housing to prevent escape and contamination of material. A 30° diverter valve is shown which is formed with a common inlet 102 and a pair of diverging equal-leg outlets 104 and 105. The outlets are separated from each other by a wedge-shaped divider 108. The apex of the divider may be formed in a narrow upper ledge 110 as shown, or may be provided with a wider flat top or land surface against which the leading edges of the blade rest in their respective closed positions to isolate the inlet from one of the selectable outlets. The blades 120, 120A, and the sectorshaped support arms 126 are constructed and mounted similarly to the corresponding blades 20 and arms 26 of the preceding embodiments. The blades may be mounted for movement in converging paths, as shown, or may be mounted for movement in slightly overlapping paths, to come into engagaement with the common apex surface 110. The non-overlapping but converging blade paths are necessary in the event it is desired to move the blades independently of each other, such as shown in FIG. 9A of my U.S. Pat. No. 3,380,475.

Figure 1:
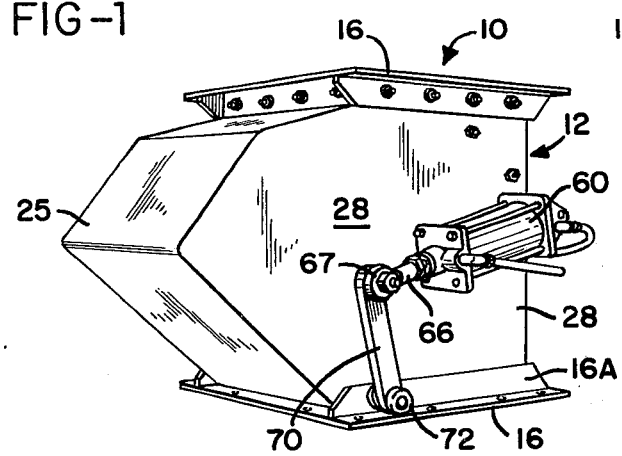
FIG. 1 is a perspective view of a single blade valve.

The valve housing, in this embodiment, is formed with a pair of offset housing portions 125 and 125A which are adapted to receive their respective blades and support arms in the open position, similarly to the manner in which the offset housing portion 25 receives the blade 20 and the corresponding support arms 26 in the embodiment of FIGS. 1–3. Similarly, lip or wiper seals 142, 142A are provided at the inlet 102 for the blades 120, 120A and perform the same function as the seal 42 previously described, in isolating the inlet 102 from the offset body portions 125 and 125A.

The blade operating arms 170, 170A are connected for concurrent movement by outside connecting straps 171, although the blades may be arranged for independent movement as previously described. A pair of blade-operating piston motors 160 are connected by a bracket 180 to the sides of the housing as shown in FIG. 13, and have their piston rods 166 connected to operate one set of the arms 170. If desired manual and/or independent operation may be used.

The same advantages are obtained by the enclosing, offset housing portion in the diverter valve embodiment as were obtained by the offset housing portion 25 with respect to the single blade valve of the preceding embodiment. The diverter valve of FIGS. 12 and 13 has particular advantages over the common flapper type of diverter valve. First, the material falling through the inlet 142 will strike the exposed outer curved surface of whichever blade is closed throughout the length of the blade, and tends to be deflected off of the blade at varying angles between the front and rear edges and there is accordingly no tendency for wear to be concentrated at any particular region of the blade, as in flapper valves. Also, in the present diverter valve construction there is no region in which the material can hang up to prevent the valve blades from opening or closing. The hangup problem is of particular difficulty in the operation of flapper type diverter valves. The offset portions 125, 125A may be provided with removable cover plates similar to the plate 84 of FIG. 6 for access to the blades. Also the blade mounting arrangement of FIGS. 9 and 10 may be used with the advantage to mount and support the leading edges of the blades 120, 120A on their respective arms 126.

It will accordingly be seen that this invention provides embodiments of fully enclosed rolling-blade type valves which are particularly adapted for controlling the flow of materials in situations where it is desirable that there can be no escape of material to the outside or contamination to the inside. The valves are particularly easy to seal since an effective seal need only be provided with the blade when it is in its closed position. The seals 48 at the valve sides, the wiper seals 42 at the inlet, and the nose seal 55 at the front wall are effective to provide the full seal to the blade in its closed position.

If desirable the blade and blade arms may be mounted so as to provide a cam or eccentric movement to the blade, to close the blade into full engagement with the side seals, in the manner disclosed in my U.S. Pat. No. 3,380,475.

While the forms of apparatus herein described constitute preferred embodiments of the invention, it is to be understood that the invention is not limited to these precise forms of apparatus, and that changes may be made therein without departing from the scope of the invention.

What is claimed is:

1. An enclosed blade valve for handling dry particulate material, comprising a generally rectangular housing having a front wall, a pair of side walls, and a back wall defining a passageway extending from a valve inlet to an outlet, a curved flow control blade movable in said housing adjacent said inlet between said side walls with the concave side thereof facing said outlet, a pair of generally sector-shaped blade supporting arms positioned in said housing adjacent said side walls, said arms presenting a narrow frontal area to offer little resistance to the movement of the blade through said material, means mounting said arms at the apex thereof on said side walls for pivotal movement, means on the wider end of said arms supporting said blade on the concave surface thereof providing for arcuate blade movement between a retracted flow permitting position in which said blade is positioned at one side of said inlet and a flow blocking position in which said blade is extended across said inlet, said back wall being formed with an offset portion and said side walls being extended to join with said back wall to form a space proportioned to receive and enclose said blade in the retracted position thereof, said offset portion having a lower inclined surface in underlying relation to said blade in the retracted position, the slope of said inclined surface being such as to be self-cleaning by gravity of any material which may fall thereon, seal means at said inlet for sealing said blade with respect to said housing walls in the closed position thereof, and means for moving said blade between its said positions, offset tab means at the forward edge of said blade and tab-engaging retainer means on said arms, said tab and retainer means being engageable by arcuate sliding movement of the blade with respect to said arms providing an attachment free of threaded fasteners for the forward edge of said blade on said arms.

* * * * *